United States Patent [19]
Kojima

[11] 3,870,169
[45] Mar. 11, 1975

[54] CONVEYOR APPARATUS FOR METAL BARS

[75] Inventor: Hiromitsu Kojima, Takehara, Japan

[73] Assignee: Mitsui Mining and Smelting Co., Ltd., Tokyo, Japan

[22] Filed: Feb. 6, 1974

[21] Appl. No.: 440,069

[52] U.S. Cl............ 214/41, 53/164, 198/29, 198/37, 212/127, 214/6 FS, 214/89
[51] Int. Cl............................................. B65g 57/04
[58] Field of Search....... 214/6 FS, 41, 89; 198/102; 53/164, 165, 244

[56] References Cited
UNITED STATES PATENTS
2,540,612  2/1951  Fischer et al. ............... 53/165 X
FOREIGN PATENTS OR APPLICATIONS
1,807,099  6/1969  Germany ..................... 214/6 FS Primary Examiner—Robert G. Sheridan
Attorney, Agent, or Firm—Woodhams, Blanchard & Flynn

[57] ABSTRACT

A conveyor apparatus for metal bars comprising a first conveyor adapted to receive metal bars during its stationary phase and subsequently to feed the bars in a longitudinal direction, a second conveyor adapted to receive metal bars from said first conveyor during its statinary phase and to feed the bars in a lateral direction through a predetermined distance before stopping, and a truck having at its lower part a vertically movable electromagnet adapted to seize metal bars aligned on said second conveyor during its stationary phase, disposed upwardly of said second conveyor and designed to travel sidewise after said electromagnet seizes the metal bars.

2 Claims, 12 Drawing Figures

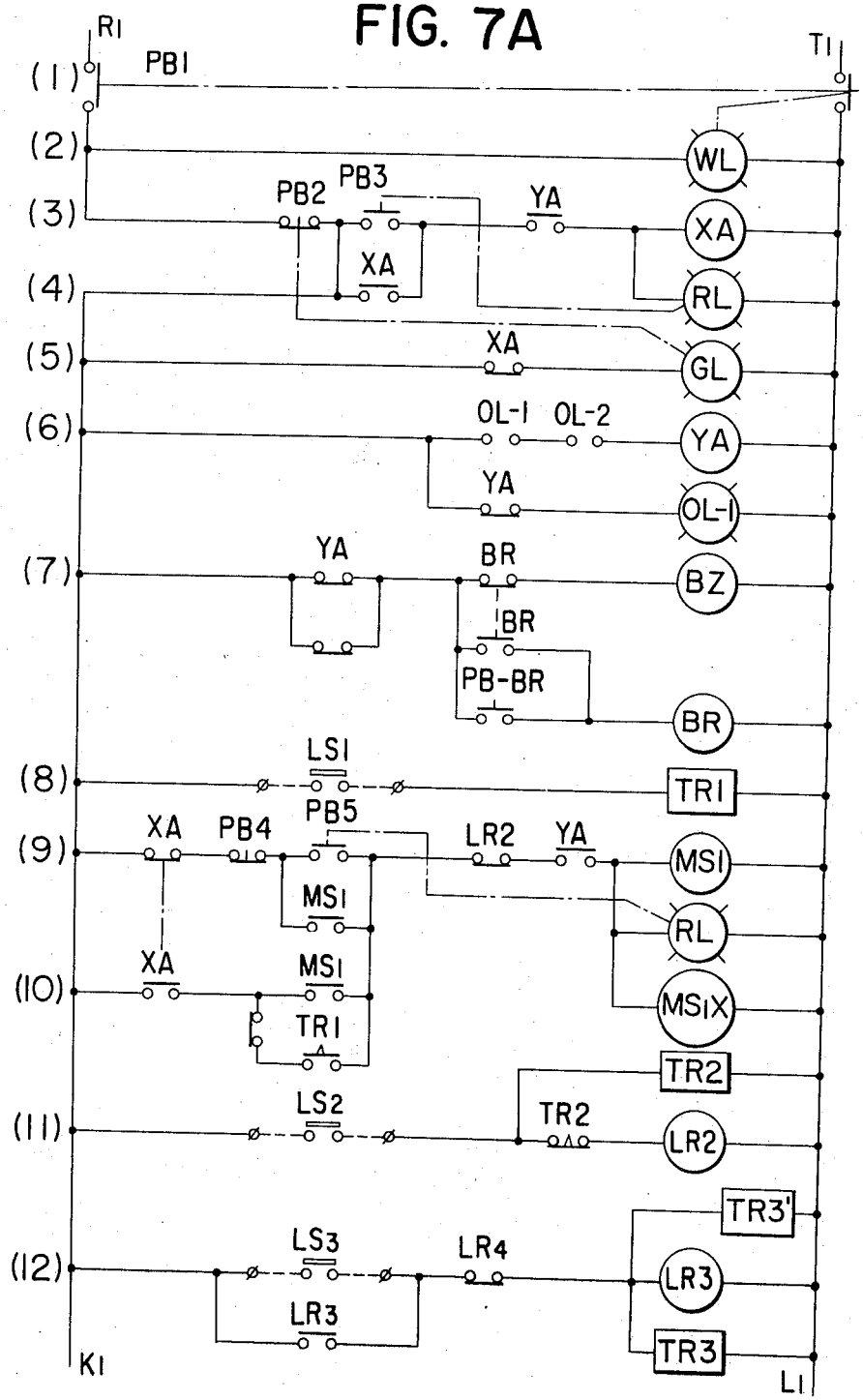

FIG. 8B
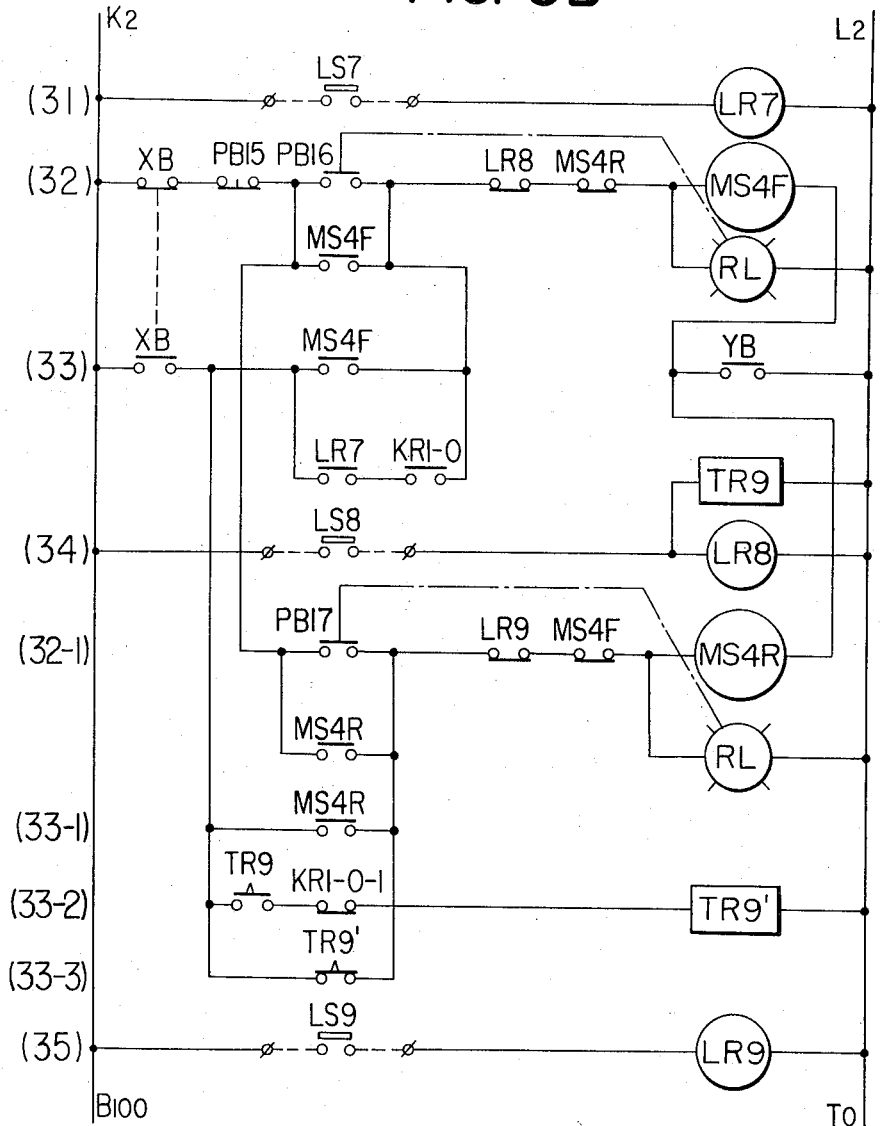
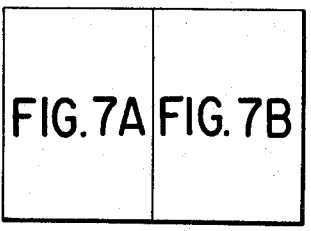
FIG. 7
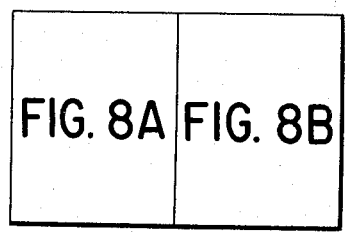
FIG. 8

CONVEYOR APPARATUS FOR METAL BARS

BACKGROUND OF THE INVENTION

The present invention relates to a conveyor apparatus for metal bars, and more particularly to such a conveyor apparatus that aligns and conveys such beams as used to suspend lead cathode plates for metallic salts electrolysis process.

Generally, because those electrode plates for metallic salts electrolysis process (mostly lead plates) are not sufficiently self supporting, they are suspended from beams during transportation or during loading and unloading into the electrolysis baths. Up to now, because there has been no automatic means for aligning and conveying those beams after removing used electrode plates from them, they have been manually handled, to a great expenditure of manpower and loss of efficiency and labor.

Accordingly, an object of the present invention is to provide a conveyor apparatus that automatically aligns, piles and efficiently conveys metal bars by combining conveyors and a hanging truck that incorporates an electromagnet, with a view to eliminating those defects.

Another object of the present invention is to provide a conveyor apparatus wherein underneath a first conveyor adapted to intermittently feed metal bars from a higher position to a lower position, a second horizontal conveyor is disposed in an intersecting relationship therewith for receiving said metal bars from said first conveyor, for intermittently conveying said bars laterally, and for aligning a required number of said bars in parallel laterally on said second conveyor, and above these aligned bars, there is disposed a hanging truck having a bottom mounted electromagnet designed to come down on those bars and lift them, said truck being adapted to travel to another position where it releases the bars, whereby those bars which are fed onto the first conveyor in an random condition are sent out automatically in an aligned condition in units of predetermined numbers, to a great convenience for subsequent bar handling operations.

A further object of the present invention is to provide a conveyor apparatus wherein underneath the stroke end position of said hanging truck, another truck is disposed, on which those bars which are released from said hanging truck are automatically transferred in an aligned condition, facilitating the conveying of bars to other processing locations.

The present invention will be explained more particularly with reference to the accompanying drawings wherein:

DETAILED DESCRIPTION OF THE INVENTION

Figure 1:
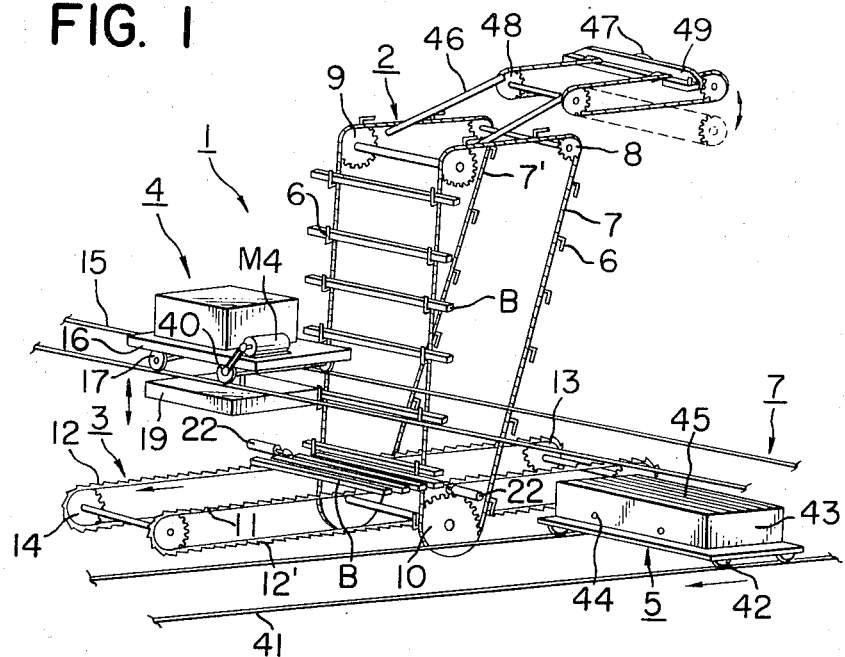
FIG. 1 is an outline oblique view of a metal bar conveyor apparatus representing an embodiment of the present invention.

Referring to FIG. 1, there is shown a conveyor device 1 comprising a first conveyor 2, second conveyor 3, a hanging trolley 4, and a trolley 5.

When for example, such a conveyor device 1 as above is utilized as a component in an electrolysis process, it is disposed between a beam extracting device (not shown) attached to an electrode plate arranging and stacking device, and a beam delivery device (not shown) attached to an electrode plate making device, whereby said first conveyor 2 is connected to said beam extracting device and said trolley 5 is connected to said beam delivery device.

The first conveyor 2 comprises a pair of chains 7 and 7', which span two sprocket pairs 8 and 9 and a driving sprocket pair 10 in a right-angle triangle form with the horizontal side at the top and another side in a nearly vertical position, and a plurality of hooks b atached in pairs on the outside of said chains 7 and 7' at an appropriate interval.

The second conveyor 3 comprises a pair of chains 12 and 12', which span a sprocket pair 13 and a driving sprocket pair 14 in a nearly horizontal disposition, and a plurality of hooks 11 attached in pairs on the outside chains 12 and 12', whereby the upper span portion of said chains 12 and 12' intersects with the bottom portion of the vertical part of said chains 7 and 7', and a pair of aligning cylinders 22 and 22' are disposed on each side of said chain pair 7 and 7', facing each other.

A pair of rails 15 carrying a hanging truck 4 through the intermediary of wheels 17, are disposed above the second conveyor 3 a little distance from the intersection between the second conveyor 3 and the first conveyor 2 along the feed direction of the second conveyor 3.

Figure 3:
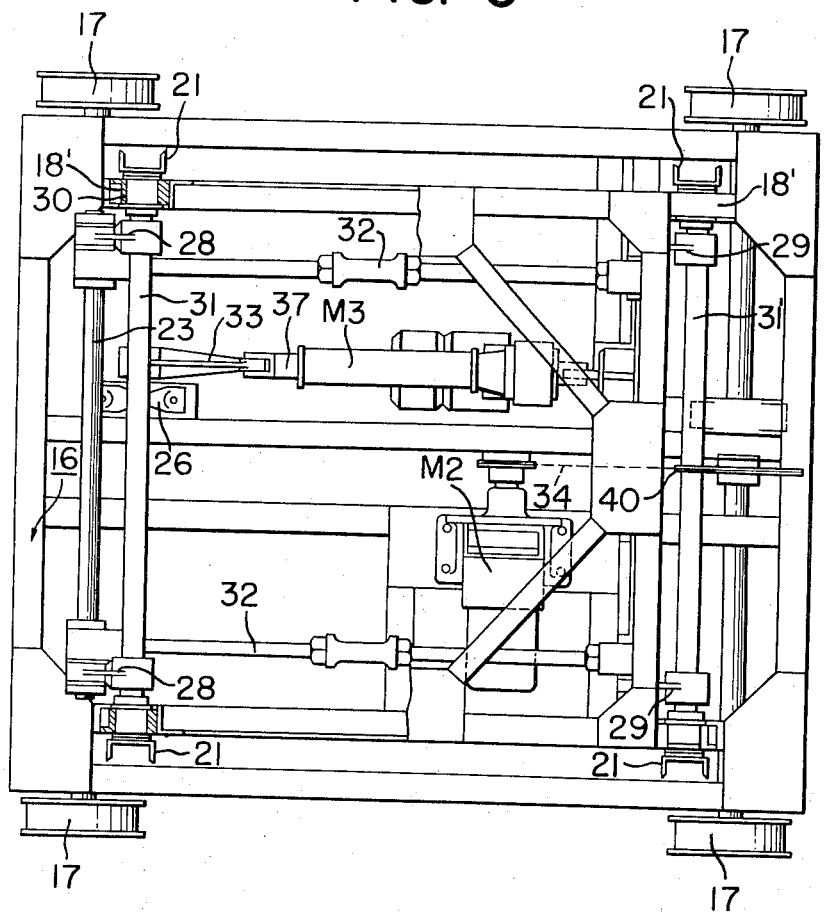
FIG. 3 is a partly sectional plan view of the object shown in FIG. 2.
Figure 4:
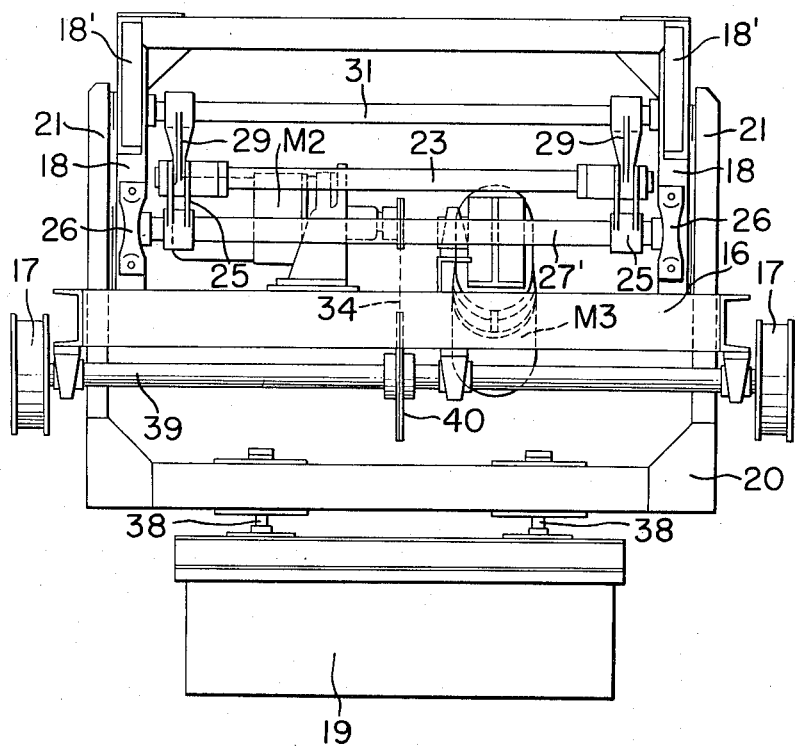
FIG. 4 is a side view of the object of FIG. 2.

Below, the detailed structure of said hanging truck 4 will be described with reference to FIGS. 2 through 4.

At the four corners of the chassis 16, there are four vertical post one each at each corner, and to each of these posts on the external side in the travelling direction, one each slide guide 18' having guide slot 30 opening in the direction perpendicular to the travelling direction is attached.

One each movable post 21 is disposed opposite to each guide slot of said chassis 16, two of which movable post 21 facing each other over two slide guides 18' are connected with one each shaft 31 and 31', that penetrates a pair of said guide slot 30. To these shaft 31 and 31', respectively pairs of end portions of parallel links 28 and 29 are swivellably connected, thereby pairs of other ends of the parallel links 28 and 29 are swivellably connected to link shafts 23 and 23' respectively. Other pairs of parallel links 24 and 25 are swivellably connected at their one ends respectively to said link shafts 23 and 23', and the other ends of the pair 24 are fixedly connected to a shaft 27 swivellably supported by bearing 26 that is mounted on said chassis 16, while the other ends of the pair 25 are fixedly connected to a shaft 27' swivellably mounted on the posts 18, whereby said two link shafts 23 and 23' are connected each other with a connecting rod 32. To said shaft 27, one end of an arm 33 is fixedly connected with the other end of said arm extending in the opposite direction to said parallel link 24 and being connected to a piston rod 37 of a power cylinder M3 that is swivellably supported at its end by the chassis 16. A motor M2 mounted on the chassis 16 is adapted to drive a sprocket 40 mounted on one wheel shaft 39 over a chain 34. At the lower ends of the movable posts 21, there is installed a hanger 20 which suspends an electromagnet 19 through the intermediary of rods 39.

In FIG. 1, a truck 5, mounted on rails 41, carries a box 43 on it, and at the lower part of the box 43, two rods 44 are laterally disposed, while on the top of the box 43, a plurality of longitudinal plates 45 are fixed at a uniform space.

A pair of guide chutes 46 are disposed in an inclination to the horizontal posrtion of said first conveyor 2 with their upper ends located in the proximity of the discharge end of a conveyor 48 which oscillates up and down around a pair of sprockets 48. A receiving tray 29 is also shown.

Figure 5:
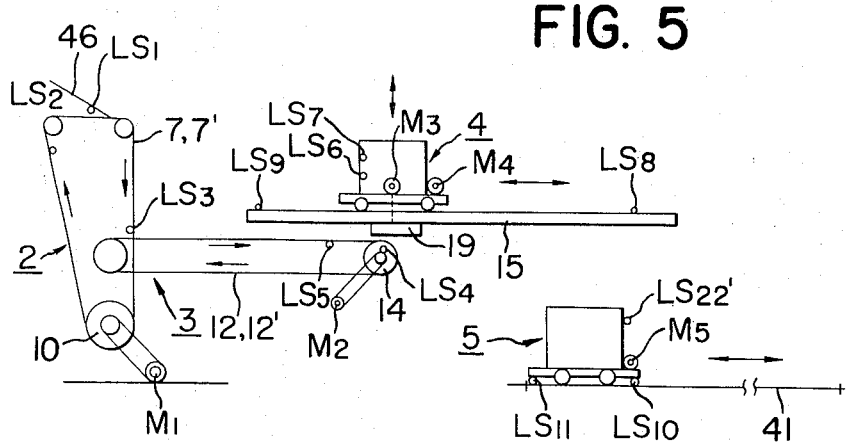
FIG. 5 is a schematic drawing showing the ararngement of the limit switches that control the object shown in FIG. 1.

Now, the arrangement of limit switches that control drive and operation of each member is explained in connection with the beam movements, in reference to FIG. 5.

Limit switches LS1 and LS2 are both incorporated in the drive control circuit for the first conveyor 2, the former being disposed within the travelling range of beams B at the intersection area between the guide chute 46 and the chains 7 and 7', and the latter being disposed within the travelling range of the hooks 6 underneath the position where the chains 7 and 7' change their direction, into horizontal one, thereby as soon as a beam B reaches the first conveyor 2 after sliding down the guide chute 46, the limit switch LS1 is closed to start a conveyor 2 driving motor M1, and then when the conveyor 2 is driven through a preset distance, a hook 6 trips the limit switch LS2 to stop the motor M1.

A limit switch LS3 that is provided to cooperate with the drive control circuit for the second conveyor 3 and the beam counter circuit is disposed in the neighborhood of the intersection between the first and second conveyors between the chains 12 and 12', so that as soon as a beam B, descending on a set of hooks 6, comes down upon the chains 12 and 12' of the conveyor 3, said limit switch LS3 is tripped to start the driving motor M2 of the conveyor 3, while a limit switch LS4 that is also incorporated in the drive control circuit for the conveyor 3 is disposed within the moving range of a driving sprocket 14 driving the conveyor 3 and having a sprocket pitch that is equal to the pitch of the hooks on the chains 12 and 12', so that when the conveyor 3 moves a distance corresponding to one pitch of the hook 11 of the conveyor 3, the sprocket teeth of the sprocket 14 moves through one pitch and the limit switch LS4 is tripped to stop the motor M2. A limit switch LS5 incorporated in the full beam load detection circuit of the conveyor 3 and in the truck electromagnet control circuit is disposed near the right end of the conveyor 3 in the passage of beams B, so that whtn a predetermined number of beams B (normally 15 - 20), being intermittently conveyed through a preset distance at a time in parallel at a regular space, is arranged on the conveyor 3, the foremost beam B trips the limit switch LS5 to stop the motor M2. Limit switches LS6 and LS7 cooperating with the driving and energizing circuit of the electromagnet and with the lift drive control circuit of the hanging truck 4 are disposed on such members of the truck 4 as the parallel links 24 and 25, the movable posts 21, and the power cylinder M3, the former detecting the lower limit of the electromagnet, and the latter detecting its upper limit to stopping the actuation of the power cylinder M3.

Limit switches LS8 and LS9 incorporated in the drive control circuit of the hanging truck 4 are disposed at both ends of the rail 15 for said truck 4, the latter limit switch tripping to stop the motor M4 when the truck 4 comes properly above one batch of arrayed beams B on the conveyor 3, while the former tripping to stop the motor M4, when the truck 4 comes above the box 43 of the truck 5. Limit switches LS10 and LS11 are incorporated in the drive control circuit of the truck 5, the former being disposed underneath the front edge of the truck 5 within the contacting range of a stopper disposed at the end of the rail 41 for said truck, while the latter being disposed underneath the rear edge of said truck within the contact range of a stopper disposed at the other end of the rail 41 of said truck below the rail 15 for said hanging truck 4, thereby when the truck 4 is found at the forward end of its stroke, the limit switch LS11 is tripped directly underneath it, to stop the motor M5 for the truck 4, thus providing the rearward limit stop for the truck 5, and similarly when the limit switch LS10 is tripped, the motor M5 is stopped thus providing the forward limit stop for the truck 5.

Below, the operation of the illustrated embodiment will be explained with reference to the control circuit diagrams FIGS. 6 through 9, wherein for the purpose of simplifying the description, each line is identified as a whole by a numeral entered in the diagrams at one end of that line in parentheses, timers and their contacts are identified by TR1, TR2 . . ., auxiliary relays and their contacts are identified by LR1, LR2 . . ., electromagnetic switches for the motors M1, M2 . . . are identified by MS1, MS2 . . ., the operating coils and the return coils for keep relays are identified by KR1-O, KR1-R, and their contacts are identified by KR1-O.

When a beam B is extracted by a beam extracting device (not shown) from an electrode plate (not shown) and is transferred onto a tray 49 on the conveyor 47 via some conveying device (not shown), the conveyor 47 detects it and raises its one end, thereby allowing the tray 29 carrying this beam B to move downward until this beam is dropped on the guide chute 46, with which the beam is sent to the first conveyor 2.

a. Operation of the first conveyor

Figure 6:
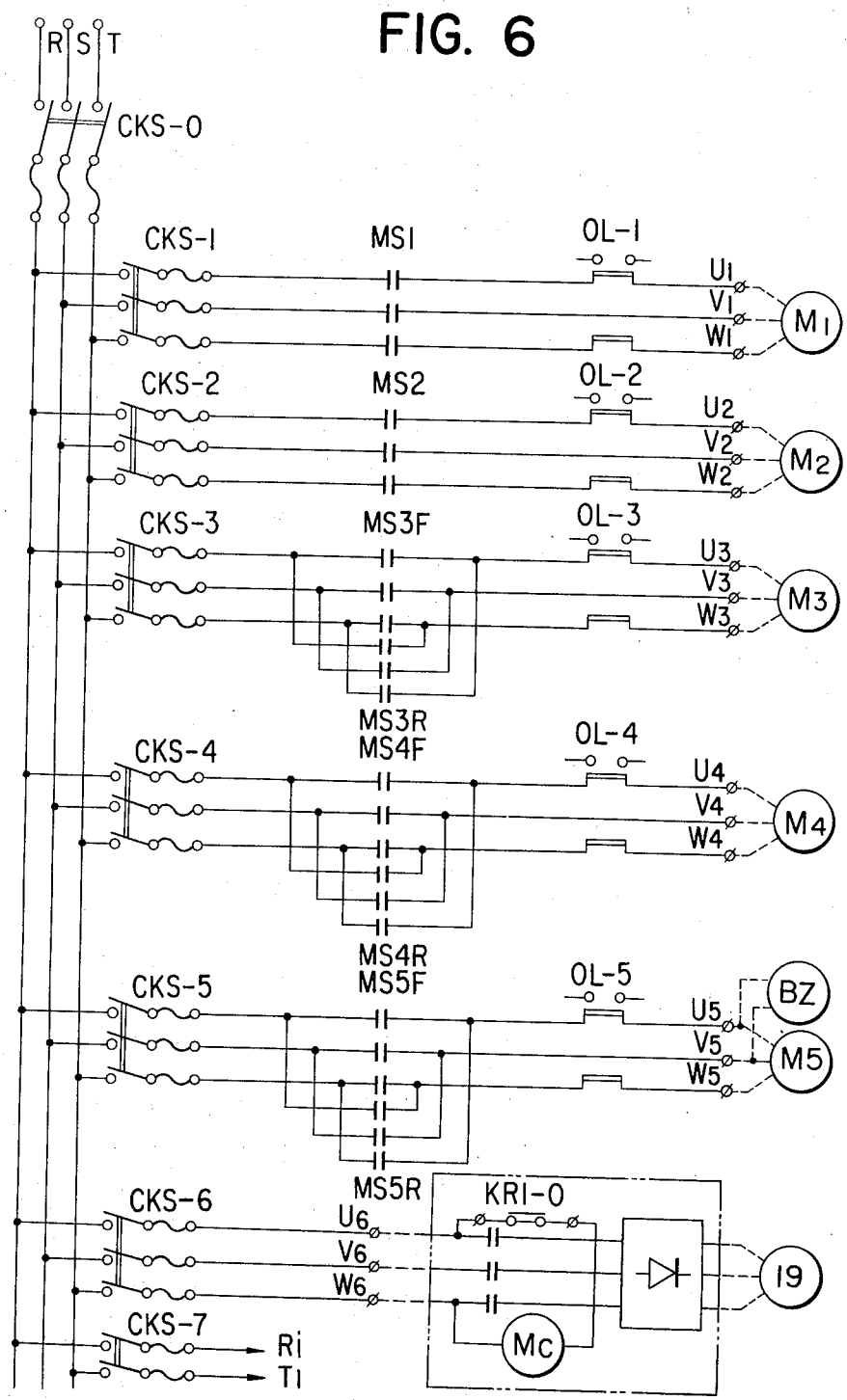
FIG. 6 through 9 are circuit drawings related to the object shown in FIG. 1.
Figure 7B:
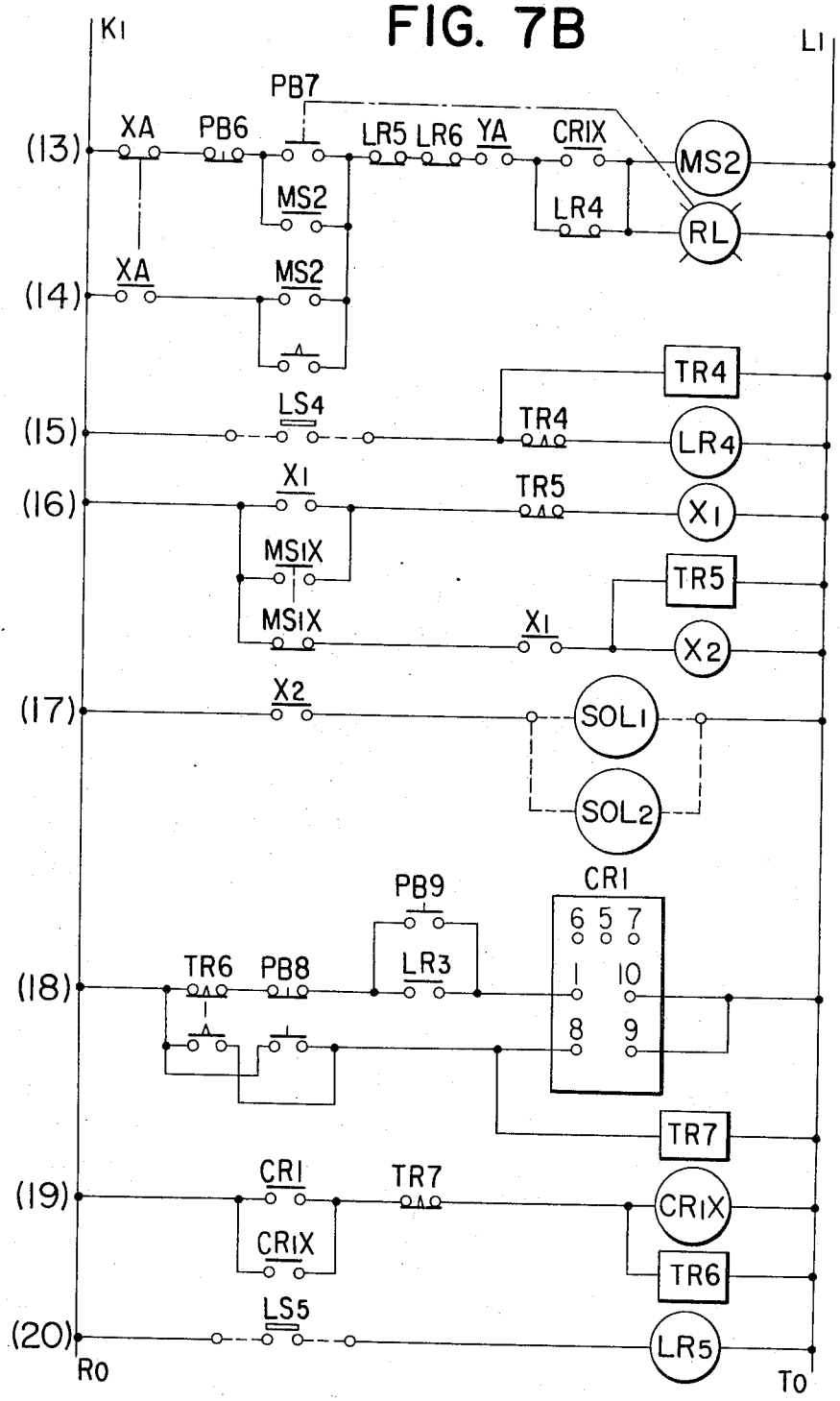
Figure 8A:
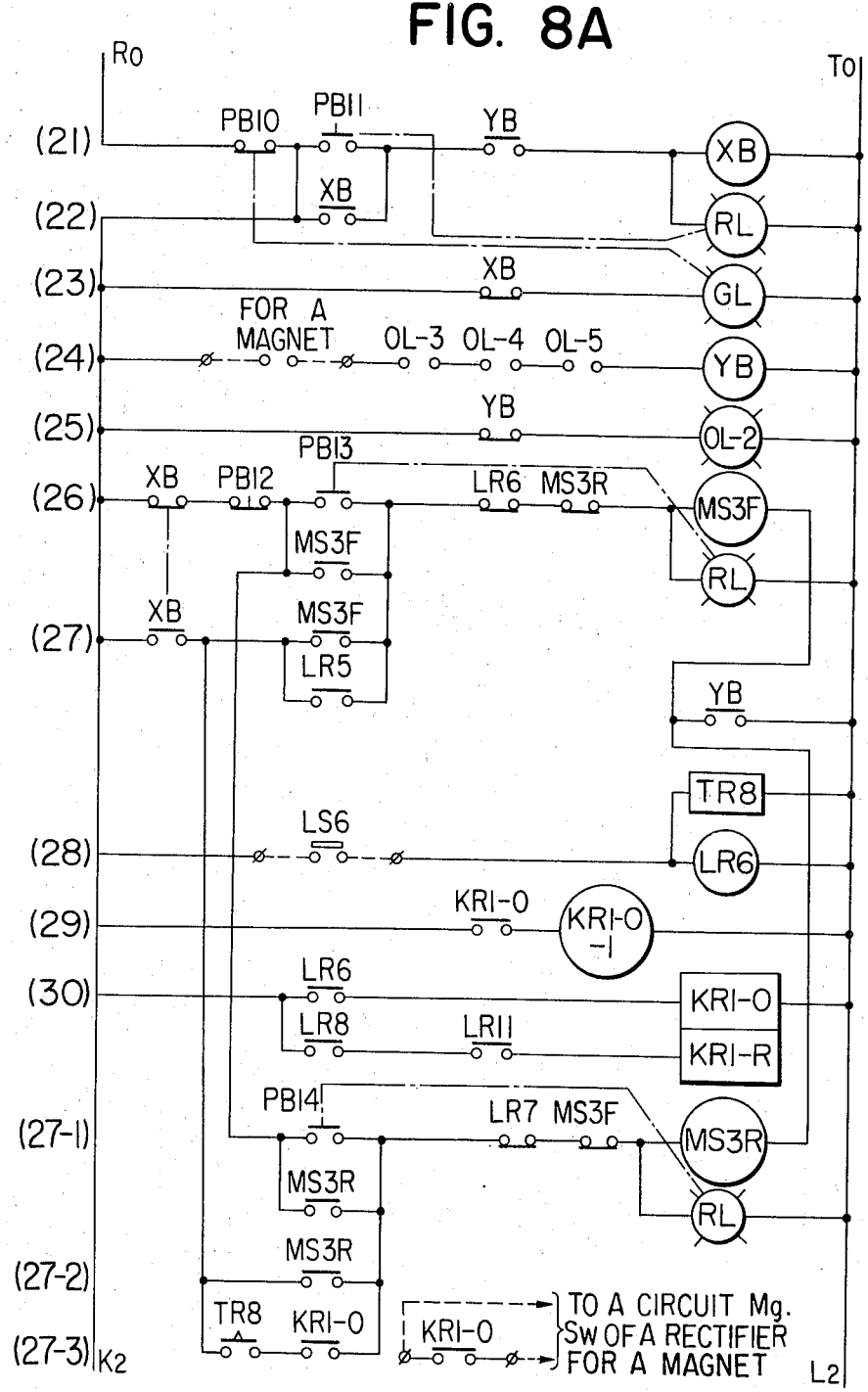
Figure 9A:
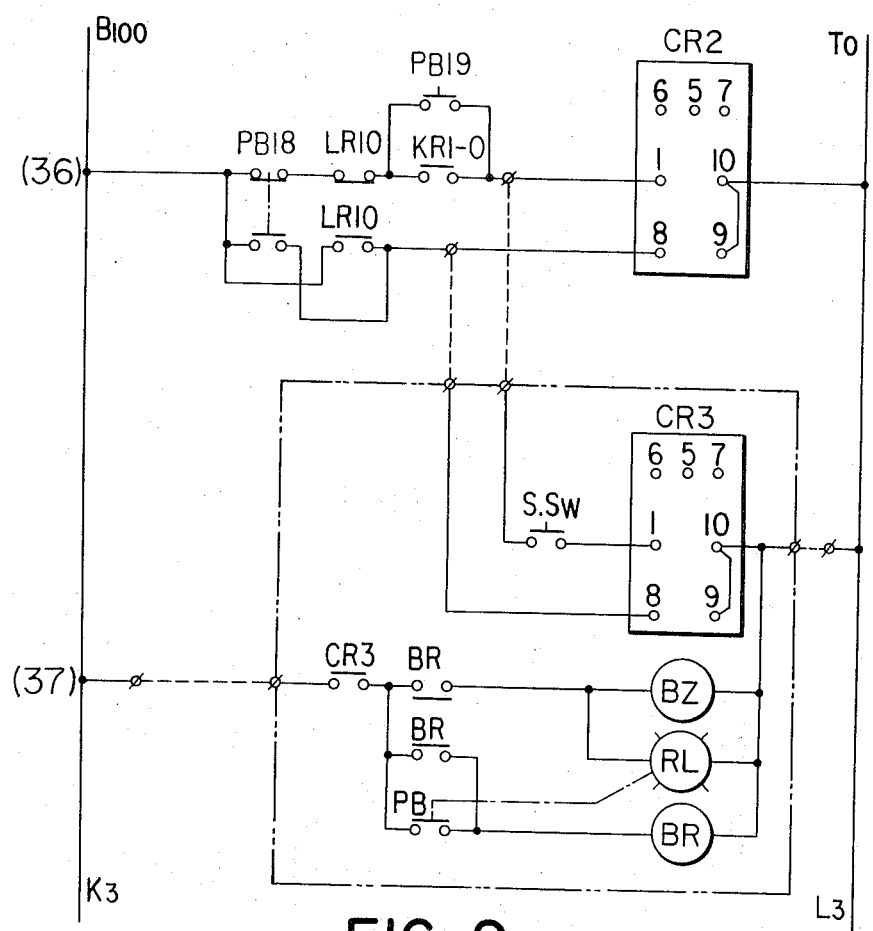
Figure 9:
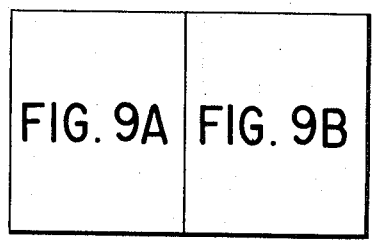
Figure 9B:
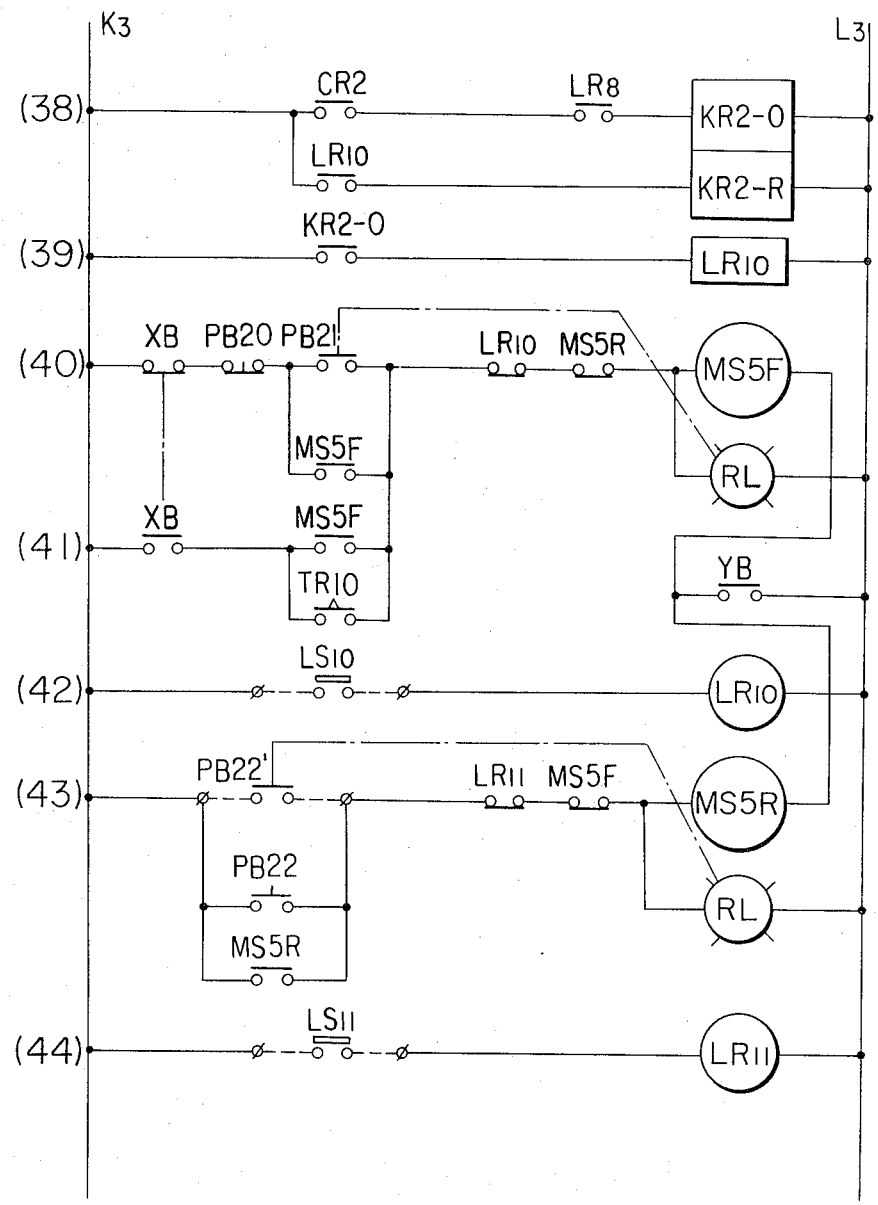

When 2, it is caught by a pair of hooks 6 on the chain 7 and 7' that happen to be in the immediate neighborhood of the lower end of the chute 46, and at the same time, the beam B trips the limit switch LS1 to energize the timer TR1 on the line (8), whereupon after a preset time interval (1 sec.), the contact TR1 on the line (10) (drive control circuit for the first conveyor) is closed by the operation of said timer, to energize the electromagnetic switch MS1, with the result that the contact MS1 in FIG. 6 is closed to start the motor M1 that drives the conveyor 2. When the conveyor 2 is driven through a predetermined distance, a hook 6 on the chains 7 and 7' trips the limit switch LS2 to energize the timer TR2 on the line (11), and at the same time, to energize the relay LR2, thus opening the contact LR2 on the line (9), with the result that the electromagnetic switch MS1 is opened to stop the motor M1. Then, after a preset time interval, the timer TR2 operates to open the contact TR2 on the line (11) thus returning the relay LR2. In this way, the beam B dropped on the conveyor 2 is conveyed from the position immediately below the lower end of the guide chute 46 through a preset distance, and an empty pair of hooks 6 are brought to the neighborhood of the lower end of the guide chute 46 to be ready to repeat the same operation when a next beam B will be dopped on the conveyor 2.

b. Operation of the second conveyor

When a beam B, being carried downward on a pair of hooks 6 on the first conveyor 2, reaches the intersection between the first conveyor and the second conveyor 3, because the first conveyor 2 and the second conveyor 3 are relatively so positioned that the stopping position of a pair of hooks 6 of the conveyor 2 is a little below the chains 12 and 12' of the conveyor 3, that beam B is transferred from the hooks 6 onto the two chains of the conveyor 3, and simultaneously, the beam trips the limit switch LS3 to energize both the timer TR3 on the line (12) and the relay LR3, which in turn closes the contact LR3 on the line (18) (beam counter circuit) to register one beam count then, after a preset time interval, the timer TR operates to close the contact TR3 on the line (14) (drive control circuit for the second conveyor) to close the electromagnetic switch MS2, with the result that the contact MS2 in FIG. 6 is close to start the motor M2 that drives the conveyor 3. When the conveyor 3 is driven, its driving sprocket 14 having the same tooth pitch as the hook pitch of the conveyor 3 turns, tripping the limit switdh LS4 with its tooth, with the result that both the timer TR4 on the line (15) and the relay LR4 are energized, which in turn open the contact LR4 on the line (15) to open the electromagnetic switch MS2, stopping the motor M2. Then, after a preset time, the timer TR4 opens the contact TR4 to return the relay LR4. When a next beam B is put on the conveyor 3, the same operation just described starts again, and while beams B are transferred form the conveyor 2 to the conveyor 3, if their alignment is disturbed, the beam aligning cylinders 22 is operated to correct the alignment. That is to say, when a beam B transferred to the conveyor 3 is sent through one pitch and stopped, and then another beam B is put on the conveyor 2 and the conveyor is driven in motion, the relay MS1X on the line (10) is simultaneoulsy energized to close the contact MS1X on the line (16) (control circuit for the beam aligning cylinders), with the result that the relay X1 is actuated to close the contact X1 energizing the timer TR3, and at the same time the relay X2 is actuated to close the contact X2 on the line (17) energizing the air valves SOL1 and SOL2, which in turn thrust guide plates towards both ends of the beam B uniformly to align the beam B on the chains 12 and 12' of the conveyor 3. Then, after a preset time interval, the timer TR5 operates to open the contact TR5 returning the relay X1, which in turn, by opening the contact X1, returns the relay X2, which in turn switches over the aligning cylinders into retraction by opening the contact X2 on the line (17). In this way, on the conveyor 3, beams B are aligned at a preset space without misalignment. When a predetermined number 15 - 20) of beams B are aligned on the conveyor 3, the switch CR1 connected to the beam counter circuit of the line (18) is closed to energize the timer TR6 on the line (19) and at the same time to actuate the relay CR1X, closing the contact CR1X on the line (13), with the result that even when the contacts LR4 on the line (13) is opened when the relay LR4 is actuated by the closing of the limit switch LS4, the operation of the electromagnetic switch MS2 is maintained, with the result that the conveyor 3 is kept in motion for further several pitches. The timer TR6 on the line (19) is operated to reverse the contact TR6 on the line (18) to start the timer TR7 on the line (18), which then open the contact TR7 on the line (19) to return the relay CR1X opening the contact CR1X on the line (13). Therefore, when a tooth of the sprocket 14 trips the limit switch LS4 to actuate the relay LR4 causing the contact LR4 on the line (13) to open, the electromagnetic switch MS2 is opened to stop the motor M2, with the result that again the motor M2 is made ready to drive the conveyor 3 beam by beam through one pitch at a time, forming a new batch of aligned beams on the conveyor 3. When the first beam of the foregoing batch comes up to the limit switch LS5 and trips it, the relay LR5 on the line (20) is actuated opening the contact LR5 on the line (13) causing electromagnetic switch MS2 to open to stop the motor M2, and at the same time, also the relay LR5 on the line (27) is closed, closing the electromagnetic switch MS3F which in turn energized the power cylinder M3 shown in FIG. 6.

c. Operation of the hanging truck

Figure 2:
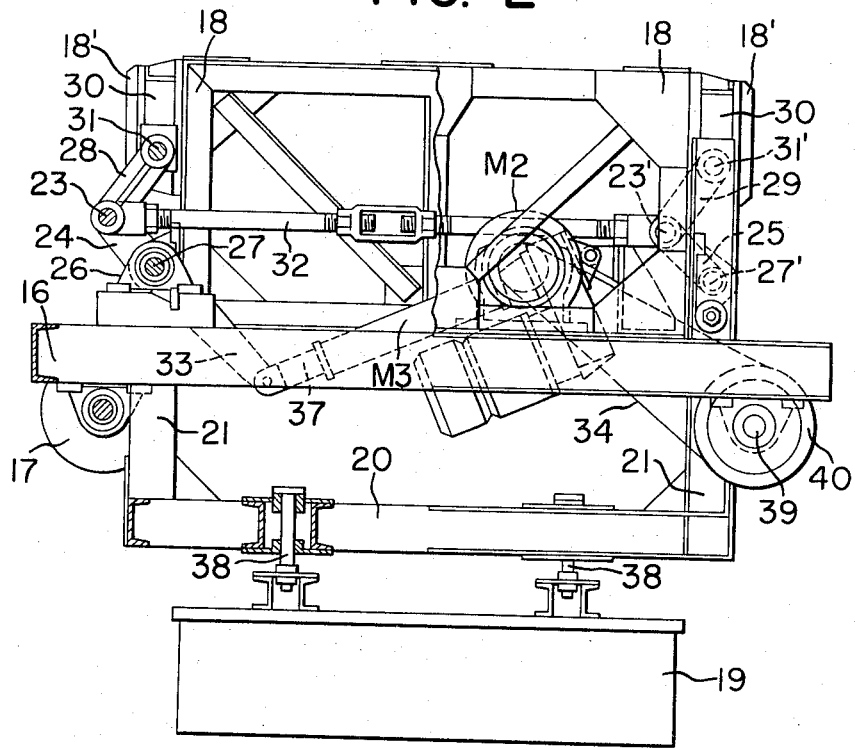
FIG. 2 is a front elevation of an example of a hanging truck, shown partly in section, incorporating a motor M2.

When the power cylinder M3 is energized while related members are in the positions shown in FIG. 2, the arm 33 rotates the shaft 27 to lift up the parallel link 24, pulling up the parallel link 25 through the connecting rod 32. When the arm 33 is turned up to the point beneath the shaft 27, both the parallel link sets 24, 28 and 25, 29 are aligned on straight lines, pushing up the movable shafts 31 and 31' as well as the movable posts 21 and 21', which in turn lift up the hanger 20 and the electromagnet 19 suspending therefrom. When the foregoing operations are reversed, the electromagnet 19 is lowered and the related members return to the initial positions.

The electromagnet 19, that is normally positioned in its lifted position above the arrayed one batch of beams on the conveyor 3, is lowered, when the power cylinder M3 is energized, through the series of operations described above together with the hanger 20, being suspended from the movable posts 21. When the limit swtich LS6 is tripped at the lower end of the hanger stroke, the relay LR6 on the line (28) is actuated to open the contact LR6 on the line (26), causing the electromagnetic switch MS3F to open, which in turn stop the power cylinder M3. Simultaneously with the above, as the relay LR6 is actuated, also the contact LR6 on the line (13) is opened to make ready for the re-closing of the contact LR5 on the same line which takes place when the beams B are removed, and another contact LR6 on the line (30) is closed to actuate KR1-O, closing the contact KR1-O on the line (27-3), with the result that the electromagnet 19 is energized to attract and seize the beams arrayed on the conveyor 3 directly below the electromagnet 19. Simultaneously with the above, as said keep relay KR7-0 is actuated, the contact KR1-0 on the line (27-3) is closed to actuate the electromagnetic switch MS3R which in turn reverse the power cylinder M3 with the result that the above-described truck motions are versed so that the hanger 20 and the electromagnet 19 that carries beams are lifted. When the hanger 20 reaches its upper stroke limit, the limit switch LS7 is closed energizing the relay LR7 on line (31), with the result that firstly, the contact LR7 on the line (27-1) is opened to open the electromagnetic switch MS3R which stops the power cylinder M3, and secondly, the contact LR7 on the line (33) is closed to close the electromagnetic switch MS4F on the line (32), which in turn starts the motor M4 driving the hanging truck 4, to move the truck 4 as a whole. When the moving hanging truck 4 reaches the position directly above the beam box 43, at its forward stroke end, the limit switch LS8 on the line (34) is closed to energize the relay LR8, opening the contact LR8 on the line (32), with the result that the electromagnetic switch MS4F is opened to stop the motor M4, stopping the hanging truck 4. The relative stopping position of the hanging truck 4 is so adjusted that when the beams B seized underneath the electromagnet 19 is released, they drop directly into the box 43. For the electromagnet to be deenergized by the actuation of the keep relay KR1-R, through the closing of the contact LR8 on the line (30), of the relay LR8, the contact LR11 on the line (30), must be in the closed condition. This is only possible when the limit switch LS11 on the line (44) is on, and the relay LRpp is in an energized condition. This means that only when the truck 5 is at its rearmost end position directly below the forward position of the hanging truck 4, where the truck 5 is in a waiting position with its rear limit switch LS11 tripped by the stopper, the electromagnet 19 can be deenergized to allow the beams to fall into the box 43 on the truck 5. After a preset time (normally 2 sec) following an actuation of the relay LR8 on the line (34), the timer TR9 is closed, actuating the timer relay TR9' so as to close the contact TR9' on the line (33-3); as the result the electromagnetic switch MS4R is closed to drive the motor M4 in reverse so as to drive the hanging truck 4 backward. When the hanging truck 4 retreats and comes to the rear end position corresponding to the position above the conveyor 3, the limit switch LS9 is tripped to actuate the relay LR9 on the line (35), with the result that the contact LR9 on the line (32-1) is opened, thereby opening the electromagnetic contact MS4R to stop the motor M4 to stop the truck 4 in its rest position. In this way, when one batch of beams are loaded on the conveyor 3, and when the foremost beam trips the limit switch LS5, the same operation starts again.

d. Motion of the trucks

As beams are stacked in each section of the box 43 on the truck 5, the number of stacked layers of beams are counted by the counter CR2 on the line (36) (beam stack counting circuit) based on the number of operations of the contact KR1-O, which is controlled by the keep relay KR1-O on the line (30). When a predetermined number of layers have been stacked, the contact CR2 on the circuit (38) is closed by a command from said counter circuit, and the, when the next batch of beams intended to form the 20th layer are conveyed by the hanging truck into a position directly above the track 5, the limit switch LS8 on the line (34) is closed actuate the relay LR8, which results on one hand in the dropping and storing of the beams in the box 43, as was mentioned earlier, and on the other hand, in the closing of the contact LR8 on the line (38) which in turn results in the actuation of the keep relay KR2-O, which actuation bringing about the following series of actuations, namely; the contact KR2-0 in the line (39) closed-relay TR10 energized — after the lapse of preset time (normally 5 sec.) relay TR10 operates — contact TR10 on the line (41) closes — motor M5 starts — the truck 5 is sent to e.g., a beam supply mechanism (not shown) in the electrode plate making process. As soon as the limit switch LS10 installed at the front end of the truck is closed by a stopper, the relay LR10 on the line (42) is actuated — the contact LR10 in the line (40) is opened — the electromagnet switch MS5F is opened with the result that the motor M5 is stopped. Simultaneously with this, the contact LR10 in the line (36) is closed, bringing the counter reading back to zero and at the same time by closing the contact LR10 in the line (38), deenergizing the keep relay KR2-R and consequently deleting the memory for completion of beam loading. After the box 43 is replaced with an empty box by a crane, the push button PB22' on the line (43) is depressed to close the electromagnetic switch MS5R, which in turn switches over the motor M5 to bring the truck 5 back. When the limit switch LS11 on the returning truck 5 is closed, the relay LR11 on the line (44) is actuated to open the contact LR11 on the line (43) opening the electromagnetic switch MS5R and consequently stopping the motor M5.

Thereupon, the hanging truck 4 immediately starts to load the box with beams B as before and thus the same operation cycle is repeated once more.

It should be understood however, that although is the foregoing description of an embodiment, only beams are assumed for the object of alignment and conveyance, the application scope of the present invention is by no means limited to beams, but generally any metallic bar-like objects, especially those susceptible to magnetic attraction or those that can be made susceptible to magnetic attraction bby some treatments or the other, can be handled.

What is claimed is:

1. A conveyor apparatus for metallic bar-formed objects comprising:
   1. a first coveyor having a vertically disposed, and intermittenly driven member, adapted to receive laterally disposed metallic bar-formed objects at its upper portion during its stationary phase, and to convey the received objects sequentially downward;
   2. a second conveyor having an intermittently driven member that is horizontally disposed underneath said first conveyor in an intersecting relationship therewith, adapted to receive on its upper side those metallic bar-formed objects, which are delivered by said first conveyor, during its stationary phase, and to convey them sequentially in a horizontal direction;
   3. a hanging truck having a vertically movable electromagnet in its lower part, adapted to be driven along a line intersecting the travelling direction of said second conveyor, at a predetermined distance therefrom, whereby said electromagnet is normally positioned above said second conveyor at a predetermined distance upward therefrom, but when a required number of metallic bar-formed objects are aligned on the second conveyor, said electromagnet is lowered, siezes the aligned objects through electromagnetic attraction, and is lifted, thereupon the truck is driven horizontally to its stroke end position where the electromagnet is deenergized.

2. A conveyor apparatus for metallic bar-formed objects according to claim 1, comprising additionally a further truck having a box for receiving metallic bar-formed objects in its upper portion, adapted to be driven on a horizontal plane disposed below the end position of said first truck travelling stroke, at a predetermined distance downward therefrom, whereby said further truck is driven to a predetermined destination as soon as said box is filled with metallic bar-formed objects.

* * * * *